(No Model.)
T. ATCHISON.
WHEELED SCRAPER.
No. 412,224. Patented Oct. 1, 1889.
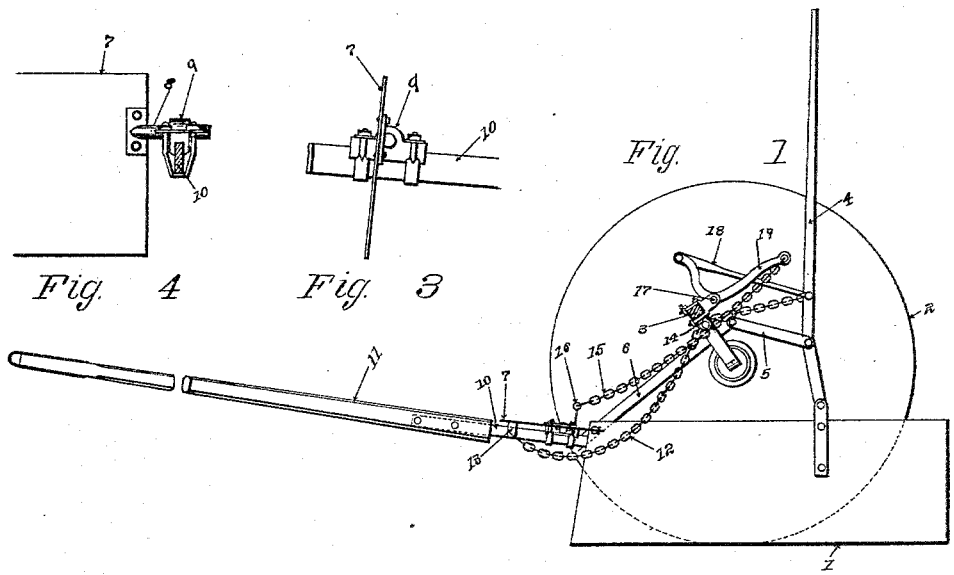
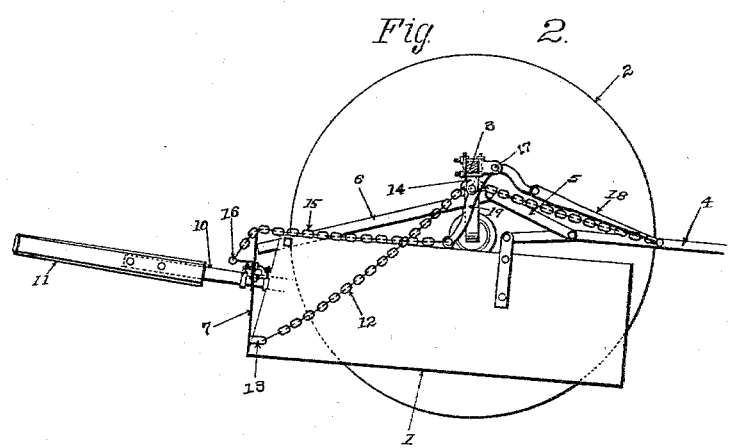
Witnesses
C. M. Day
L. F. Wilber
Inventor
Thomas Atchison
By his Attorney A. J. O'Brien

UNITED STATES PATENT OFFICE.

THOMAS ATCHISON, OF DENVER, COLORADO.

WHEELED SCRAPER.

SPECIFICATION forming part of Letters Patent No. 412,224, dated October 1, 1889.

Application filed May 6, 1889. Serial No. 309,832. (No model.)

*To all whom it may concern:*

Be it known that I, THOMAS ATCHISON, a citizen of the United States of America, residing at Denver, in the county of Arapahoe and State of Colorado, have invented certain new and useful Improvements in Wheeled Scrapers, of which the following is a specification, reference being had therein to the accompanying drawings.

My invention relates to a new form and construction of a device for retaining the full load which has been scooped up by a wheeled scraper, such as is used by those engaged in excavating, grading, &c.

It is well known to contractors and others familiar with the use of earth-scrapers that from twenty to twenty-five per cent., or even a greater per cent., of the original load scooped up by the ordinary scraper is lost by falling off from the front end of the scraper before the point for dumping is reached, the loss from this cause depending considerably, as a matter of course, on the distance the load is to be carried.

The object of my invention is to provide a means of overcoming this difficulty, which means shall be simple in construction, cheap, and easily operated, and which may also be readily attached to any of the wheeled scrapers now in use. This object I attain by the use of the mechanism illustrated in the accompanying drawings, in which—

Figure 1 is an elevated section of a wheeled scraper provided with my improvement, the same being shown in the horizontal or open position. Fig. 2 is an elevated section of a wheeled scraper, showing my improvement in the vertical or closed position. Fig. 3 is an enlarged side elevation of my improvement, showing its pivoting mechanism. Fig. 4 is a rear elevation of the same.

In the drawings, the reference-numeral 1 designates the scraper-box, mounted upon wheels 2, provided with an axle 3, the scraper-box being raised, lowered, tilted, and dumped by means of levers 4, 5, and 6, suitably arranged and connected.

7 is an end-gate, provided with a stationary pivot 8 at each end, made fast to the gate in any suitable manner. Pivots 8 are secured and turn freely within suitable sockets or journal-boxes 9, made fast to the rear branched arms 10 of the tongue 11.

Reference-numeral 12 is a chain attached at one extremity to lever 4 and at the other extremity to an eye 13, attached to the gate 7 midway between the ends of the gate and below the pivot 8. Chain 12 passes over a pulley 14, suitably attached to the axle 3.

Reference-numeral 15 is a chain attached at one extremity to one end of a bell-crank lever 19 and at the other extremity to an eye 16, made fast to the gate 7 at any suitable point midway between the ends of the gate. Bell-crank lever 19 is provided with a suitable fulcrum 17, attached to the axle, as shown. One extremity of lever 19 is pivoted to one end of a rod 18, the opposite extremity of rod 18 being pivoted to lever 4.

In describing the operation of my improved device, I will suppose the gate is open, as shown in Fig. 1, and the scraper is full. Lever 4 is then drawn backward and downward to the position shown in Fig. 2, which closes the gate by virtue of its connection with lever 4 by chain 12, placing the rest of the mechanism in the relative position shown in Fig. 2. Gate 7, being in the positions shown in Fig. 2, closes the mouth of the scraper-box for several inches at the bottom, leaving a narrow triangular open space above and on each side, though this space is so small that no appreciable amount of the scraper's contents will escape through the same. When ready to dump the scraper, lever 4 is raised to the position shown in Fig. 1, which slackens chain 12, throws lever 19 to the position shown in Fig. 1, and opens gate 7 by virtue of its connection with lever 19, by chain 15.

It will be observed that gate 7, being pivoted to the rear branched arms of the tongue, is entirely independent of the scraper-box, remaining undisturbed in the position shown in Fig. 1 during the dumping of the load.

Having thus described my invention, what I claim, and desire to secure by Letters Patent, is—

1. The combination, in a wheeled earth-scraper, of an end-gate 7, suitably pivoted between the rear branched arms of the tongue and operated by a chain 12, attached to lever 4 at one extremity and to the gate at the other extremity, a chain 15, connected to lever 19, and a rod 18, connecting the gate with lever 4, substantially as set forth.

2. In a wheeled earth-scraper provided with an end-gate 7, pivoted between the rear branched arms of the tongue, the combination, with suitable operating mechanisms consisting of a chain attached at one extremity to the gate below its pivotal point, thence passing over a suitable pulley secured to the axle, and attached to the lever 4 at the other extremity, of another chain connected to lever 19 and rod 18 and connecting the gate with lever 4, substantially as set forth.

In testimony whereof I affix my signature in presence of two witnesses.

THOMAS ATCHISON.

Witnesses:
  Z. F. WILBER,
  O. B. OTTE.